(12) United States Patent
Lowitz (10) Patent No.: US 11,971,251 B2
(45) Date of Patent: *Apr. 30, 2024

(54) BUILDING INSPECTION AND MEASUREMENT DEVICE

(71) Applicant: Gregory E. Lowitz, Redwood City, CA (US)

(72) Inventor: Gregory E. Lowitz, Redwood City, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/841,770

(22) Filed: Jun. 16, 2022

(65) Prior Publication Data

US 2022/0307809 A1    Sep. 29, 2022

Related U.S. Application Data (63) Continuation of application No. 16/704,712, filed on Dec. 5, 2019, now Pat. No. 11,378,374.

(60) Provisional application No. 62/776,664, filed on Dec. 7, 2018.

(51) Int. Cl.
| | |
|---|---|
| *G01B 3/04* | (2006.01) |
| *G01B 3/34* | (2006.01) |
| *G01B 3/56* | (2006.01) |
| *G01B 5/02* | (2006.01) |
| *G01B 5/08* | (2006.01) |

(52) U.S. Cl.
CPC ............... *G01B 3/04* (2013.01); *G01B 3/34* (2013.01); *G01B 3/56* (2013.01); *G01B 5/02* (2013.01); *G01B 5/08* (2013.01)

(58) Field of Classification Search
None
See application file for complete search history.

(56) References Cited

U.S. PATENT DOCUMENTS

| | | |
|---|---|---|
| 1,409,723 A | 3/1922 | Jacob |
| 1,497,492 A | 6/1924 | Engel |
| 1,776,245 A | 9/1930 | Barrett |
| 2,016,489 A | 10/1935 | Escalante |
| 3,795,053 A | 3/1974 | Burke |
| 4,461,092 A | 7/1984 | Hore |
| 4,490,921 A | 1/1985 | Woods et al. |
| 4,499,665 A | 2/1985 | Davis |
| 4,614,042 A | 9/1986 | Maurer |
| 5,459,936 A | 10/1995 | Stange |
| 6,049,987 A | 4/2000 | Robell |
| 6,095,739 A | 8/2000 | Albertson et al. |
| 6,158,135 A | 12/2000 | Rank |
| 6,637,121 B2 | 10/2003 | Barefoot |

(Continued)

*Primary Examiner* — Yaritza Guadalupe-McCall
(74) *Attorney, Agent, or Firm* — Price Heneveld LLP (57) ABSTRACT

An inspection and measurement device includes a body defining a first planar face within a first bounded area, a first reference feature disposed on the first planar face within the first bounded area and corresponding with a first measurable parameter for structural inspection, and a second reference feature disposed on the first planar face within the first bounded area and corresponding with a second measurable parameter for structural inspection. The first and second reference features are positioned within the first bounded area for placement adjacent an element bearing the respective one of the first and second measurable parameters, and the first and second reference features overlap within the first bounded area in at least one direction.

19 Claims, 4 Drawing Sheets

(56) References Cited

U.S. PATENT DOCUMENTS

| | | |
|---|---|---|
| 6,658,746 B2 | 12/2003 | Ganivet |
| 6,854,189 B2 | 2/2005 | Schafer |
| 6,860,046 B1 | 3/2005 | Squitieri |
| 6,918,189 B1 | 7/2005 | McBrayer |
| 6,925,724 B2 | 8/2005 | Tandy |
| 6,983,544 B2 | 1/2006 | Echizenya |
| 7,398,601 B2 | 7/2008 | Morrell |
| 7,603,787 B1 | 10/2009 | Butler, III |
| 7,743,521 B2 | 6/2010 | O'Morrow, Sr. |
| 8,021,158 B2 | 9/2011 | Eras et al. |
| 8,209,876 B2 | 7/2012 | Bukhary |
| 8,505,209 B2 | 8/2013 | Estocado |
| 8,707,574 B2 | 4/2014 | Goldrick et al. |
| 10,619,990 B2 | 4/2020 | Chen |
| 11,378,374 B2 * | 7/2022 | Lowitz .................... G01B 3/34 |
| 2002/0166246 A1 | 11/2002 | Ganivet |
| 2006/0032068 A1 | 2/2006 | Sherman et al. |
| 2020/0182598 A1 | 6/2020 | Lowitz |

\* cited by examiner

BUILDING INSPECTION AND MEASUREMENT DEVICE

CROSS REFERENCE TO RELATED APPLICATIONS

This application is a continuation of and claims priority to U.S. application Ser. No. 16/704,712, filed on Dec. 5, 2019, now U.S. Pat. No. 11,378,374, which claims priority under 35 U.S.C. § 119(e) and the benefit of U.S. Provisional Application No. 62/776,664, filed on Dec. 7, 2018, both of which are entitled "BUILDING INSPECTION AND MEASUREMENT DEVICE," the entire disclosure of each are incorporated herein by reference.

FIELD OF THE INVENTION

The present invention relates generally to building inspection and measurement, including in the areas of inspection and damage measurement and assessment in the fields of construction, structural and civil engineering, forensic analysis, code compliance, property management, and insurance-claims adjustment. More particularly, the invention relates to a single device with reference features for measuring a number of associated parameters related to building inspection and measurement.

BACKGROUND

Visual gauges and other measuring devices are important tools of the trade for constructors, engineers, code-compliance inspectors, home and building inspectors, property managers, and insurance adjusters. Historically, professionals have carried a number of bulky, single-purpose tools, each optimized for a specific measurement task. Examples include tape measures, rulers, slope levels, protractors, calipers, thickness gauges, and the like. To help address this challenge, the applicant of the present invention disclosure offers a wallet-sized gauge (sold under the CRACKMON® 224R name by Buildera™ of Redwood City, Ca. and available at www.buildera.com/crackmon-224r-crack-width-comparator/) that combines three measurement functions including a ruler, crack-width comparator, and slope indicator in a flexible snap-off card similar in size to a credit card. While very useful for measuring cracks and separations in foundations, a gauge with more space and larger dimensions would be able to include additional useful functions relevant to additional fields wherein measurement is needed, such as for building professionals and insurance adjusters.

For many building inspection and code compliance applications, field inspectors and the like desire to carry fewer tools, especially when inspecting damp crawlspaces and basements for cracks in foundations, roofs for hail damage, and other areas with restricted access or potentially hazardous working conditions. Moreover, professionals want a solution that is cost effective, lightweight, all-weather capable, resistant to breakage and corrosion, and easy to clean and maintain with ordinary soap and water. Many tools and gauges with moving mechanical components require lubricants and caustic cleaning solutions to maintain trouble-free operation. Failure to maintain such tools lowers their usable lifespan, thereby increasing the lifetime cost of ownership.

Moreover, there is a gray market of substandard building materials—such as mechanical fasteners—that fall short of specified size and strength standards. For example, ASTM Standard F1667-18 Standard Specification for Driven Fasteners: Nails, Spikes, and Staples (available from ASTM International: www.astm.org/Standards/F1667.htm) defines the size and wire-gauge diameter of structural fasteners, such as nails, spikes and staples. Examples of potentially dangerous goods include imported nails and other substandard fasteners that may be shorter or thinner than specified, leading to potential structural failure during a natural disaster, such as an earthquake, hurricane, flood, or other high-impact event. Fast incoming inspection and forensic post-mortem analysis of fasteners such as common nails are essential to ensuring code compliance and occupant safety.

In light of the general need to ensure code compliance and provide building and damage assessment services, there remains a need for an inexpensive, lightweight, all-weather capable, pocket-sized, durable, go/no-go measurement tool that satisfies many common inspection requirements in a single device with no moving parts. The device should be easy to use, with each function clearly marked and easy to read in a range of lighting conditions, both indoors and outdoors.

SUMMARY

This summary introduces a selection of concepts in a simplified form that are further described below in the Detailed Description. This summary is not intended to identify all the key features of the claimed subject matter on its own, nor is it intended to be used on its own as an aid in determining the scope of the claimed subject matter.

The present disclosure provides home and building inspectors, constructors, engineers, code-compliance officials, property managers, and insurance adjusters with a combined inspection and measurement device with at least four or more distinct measurement functions that meet the objectives of being inexpensive, lightweight, all-weather capable, pocket-sized, durable, easy to maintain, and easy to use.

In one aspect of the disclosure, a combined inspection and measurement device builds on the applicant's prior art that measures distance, crack width, and slope, to now include additional measurements of either or both hail-impact diameter and common nail sizes—all measurements that have historically required dedicated measurement devices and gauges.

According to one aspect of the present disclosure, an inspection and measurement device includes a body defining a first planar face within a first bounded area, a first reference feature disposed on the first planar face within the first bounded area and corresponding with a first measurable parameter, and a second reference feature disposed on the first planar face within the first bounded area and corresponding with a second measurable parameter. The first and second reference features are positioned within the first bounded area for placement adjacent an element bearing the respective one of the first and second measurable parameters. The first and second reference features overlap within the first bounded area in at least one direction. In various aspects, the first reference feature may be selected from the group consisting of: a plurality of tick marks extending over and equally distributed among a predetermined linear area for measuring length; a plurality of marks of increasing width extending over a linear area for measuring crack and material width; a plurality of lines extending from an apex at a predetermined length and distributed over a predetermined angular range for measuring relative slope between two features; and, a plurality of concentric semi-circular elements radiating from a center and extending outward over an area for measuring hail-impact diameter. Further, the second reference feature may be another from the listed group. Additionally, or alternatively, the second reference feature may include a nail gauge array accompanied by a conversion chart between Common Nails and Box Nails.

According to another aspect of the present disclosure, an inspection and measurement device includes a transparent body defining a first planar face within a first bounded area and a second planar face spaced apart from the first planar face, a first reference feature disposed on the first planar face within the first bounded area and corresponding with a first measurable parameter, an opaque layer disposed on the first planar face over the first reference feature, and a second reference feature disposed on the opaque layer and corresponding with a second measurable parameter. The first and second reference features are positioned within the first bounded area for placement adjacent an element bearing the respective one of the first and second measurable parameters, the first reference feature is visible through the transparent body from toward the second planar face, and the second reference feature is visible from toward the first planar face.

According to another aspect of the present disclosure, a method for fabricating an inspection and measurement device includes printing a transparent substrate with a printed layer having a solid sub-layer and first and second graphical sub-layers, each including at least one printed reference feature, on opposite sides of the solid sub-layer.

According to another aspect of the present disclosure, an inspection and measurement device includes a body defining a first planar face within a first bounded area, a first reference feature disposed on the first planar face within the first bounded area and corresponding with a first measurable parameter for structural inspection, and a second reference feature disposed on the first planar face within the first bounded area and corresponding with a second measurable parameter for structural inspection. The first and second reference features are positioned within the first bounded area for placement adjacent an element bearing the respective one of the first and second measurable parameters, and the first and second reference features overlap within the first bounded area in at least one direction.

According to another aspect of the present disclosure, an inspection and measurement device includes a transparent body defining a first planar face within a first bounded area and a second planar face spaced apart from the first planar face, a first reference feature disposed on the first planar face within the first bounded area and corresponding with a first measurable parameter, a second reference feature disposed on the first planar face within the first bounded area and corresponding with a second measurable parameter, and an opaque layer disposed on the first planar face and spaced from at least one edge of the transparent body, the opaque layer being disposed over a portion of the first reference feature and at least a portion of the second reference feature. The first and second reference features are positioned within the first bounded area for placement adjacent an element bearing the respective one of the first and second measurable parameters, at least the first reference feature extending past the opaque layer to the edge of the transparent body, and the first and second reference features overlap within the first bounded area in at least one direction.

According to another aspect of the present disclosure, an inspection and measurement device includes a transparent body defining a first planar face within a first bounded area and a second planar face spaced apart from the first planar face, a first reference feature disposed on the first planar face within the first bounded area, facing the second planar face, and corresponding with a first measurable parameter for structural inspection, a second reference feature disposed on the first planar face, facing the second planar face, and corresponding with a second measurable parameter for structural inspection, and a third reference feature disposed on the first planar face, facing the away from second planar face, and corresponding with a third measurable parameter for structural inspection. The first and second reference features are positioned within the first bounded area for placement adjacent an element bearing the respective one of the first and second measurable parameters, and the first and second reference features overlap within the first bounded area in at least one direction.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessarily to scale. Certain features of the invention may be exaggerated in scale or shown in schematic form in the interest of clarity and conciseness.

In the drawings.

DETAILED DESCRIPTION OF EMBODIMENTS

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

Figure 1:
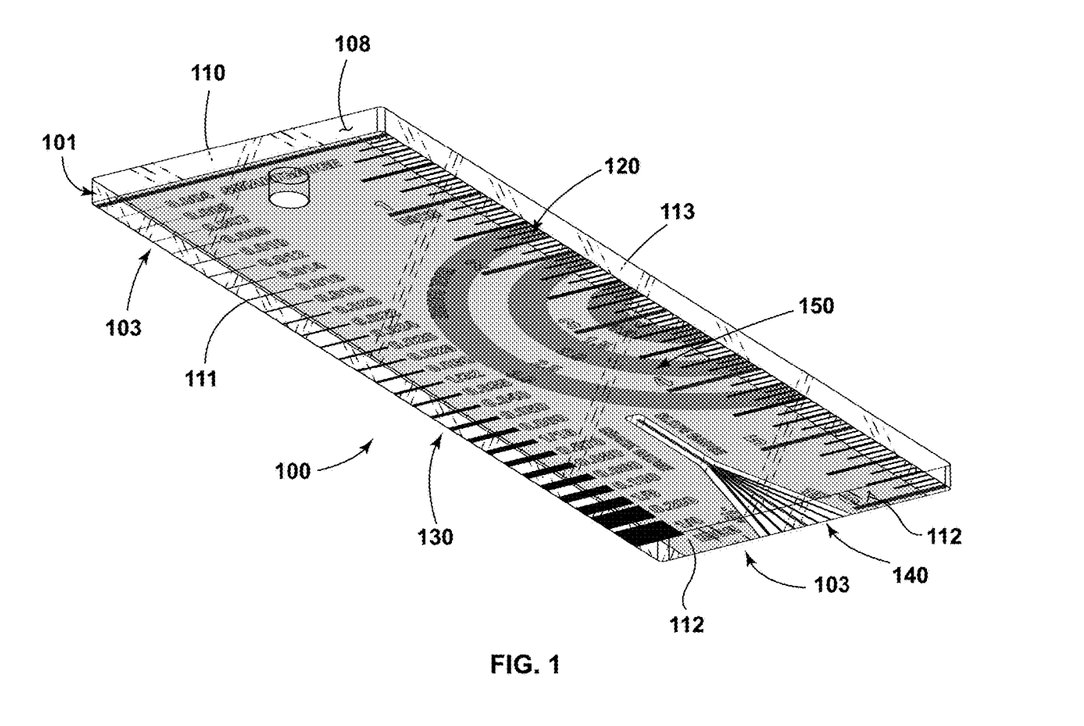
FIG. 1 is a front-bottom perspective view of a building inspection and measurement device.
Figure 2:
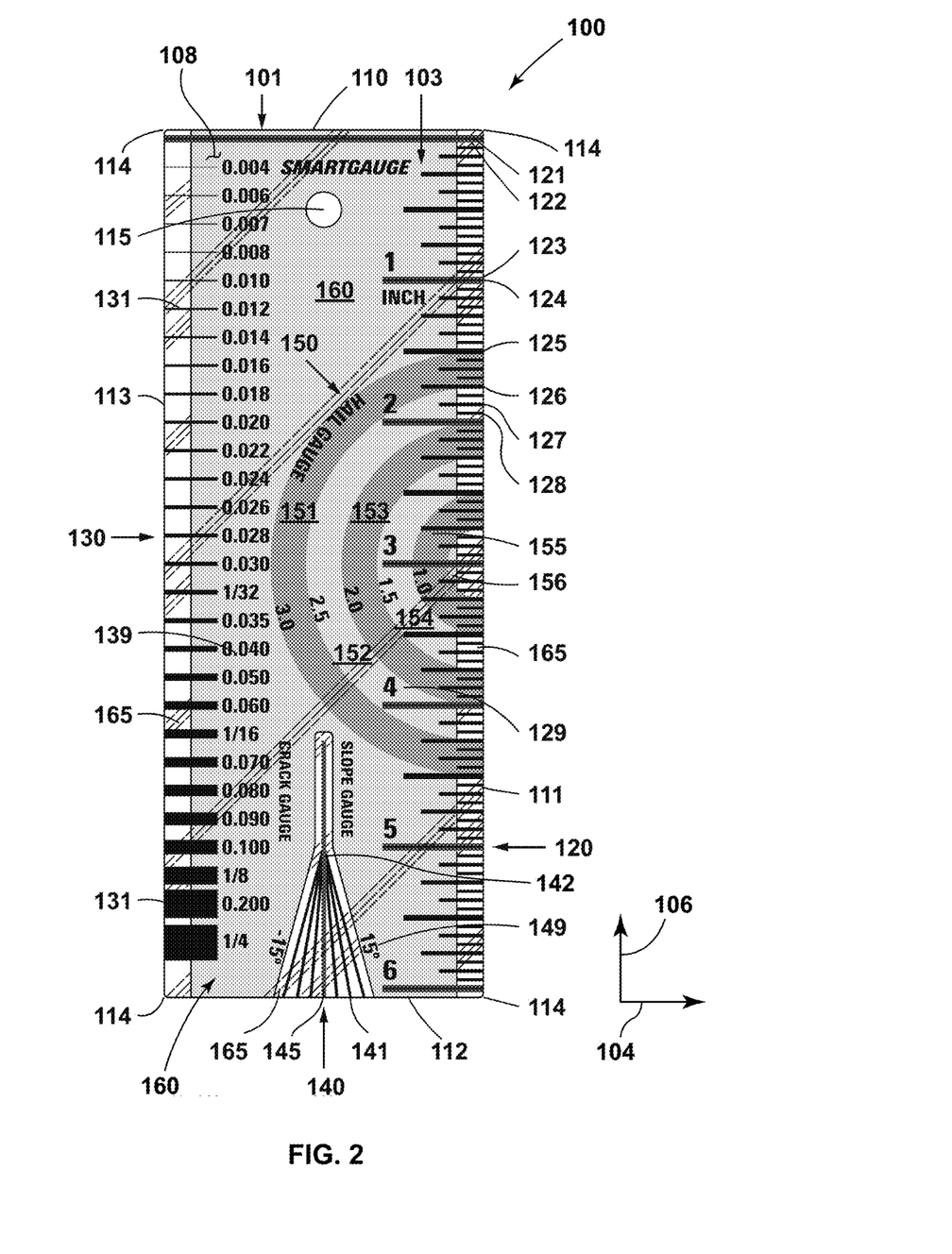
FIG. 2 is a front elevation view of a building inspection and measurement device.

A building inspection and measurement device with a multiplicity of gauges is illustrated in the drawings and generally designated 100. With reference to FIGS. 1-5, the illustrated example of the building inspection and measurement device 100 includes a body 101 defining a first planar face 103 within a first bounded area. Particularly, as shown in FIGS. 1 and 2, the first planar face 103 is a lower face in which the face 103 is defined within and bounded by the top edge 110, right edge 111, bottom edge 112, left edge 113, and radiused corners 114 of the body 101. A first reference feature, as discussed further below in connection with specific examples thereof, is disposed on the first planar face 103 within the first bounded area and corresponds with a first measurable parameter, as described below in connection with the reference features, and a second reference feature is also disposed on the first planar face 103 within the first bounded area and corresponds with a second measurable parameter. The first and second reference features are positioned within the first bounded area for placement adjacent an element bearing the respective one of the first and second measurable parameters. The first and second reference features overlap within the first bounded area in at least one direction 104 or 106.

In various aspects, the first and second reference features may be various combinations of a ruler 120 consisting of a plurality of tick marks 123-128 extending over and equally distributed among a predetermined linear area (e.g. along edge 111 of body 101) for measuring length, a width gauge 130 consisting of a set of marks 131 of increasing width extending over a linear area (e.g. along edge 113 of body 101) for measuring crack width and/or material thickness, a slope gauge 140 consisting of a plurality of lines 141,145 extending from an apex 142 at a predetermined length (e.g. about 1 in) and distributed over a predetermined angular range (e.g. +/−15°) for measuring relative slope between two features, and hail gauge 150 consisting of a plurality of concentric semi-circular elements (151-156) radiating from a center (e.g. element 156) and extending outward over an area (e.g. the area defined by element 151) for measuring hail-impact diameter. Additionally or alternatively, the second reference feature may include a nail gauge array 220 (FIG. 3) accompanied by a conversion chart (230) between Common Nails and Box Nails.

As mentioned, and as shown in FIGS. 1 and 2, device 100 includes a substrate or body 101, whose physical boundary is composed of a top edge 110, right edge 111, bottom edge 112, left edge 113, radiused corners 114. In the present example, an interior hang hole 115 extends through a portion of body 101 adjacent the top edge 110. Hang hole 115 is integral to the device to allow it to hang on a tool rack or belt carabineer. The hang hole 115 diameter may be between 0.125 inch (3 mm) and 0.375 inch (10 mm), and in one implementation 0.25 inch (6 mm). In one aspect, the body 101 is made from transparent or opaque thermoplastic such as flexible PETG, polycarbonate or PVC sheet, measuring approximately 6 inches (15 cm) long (e.g. between top edge 110 and bottom edge 112) by 2 inches (5 cm) wide (e.g. between left edge 113 and right edge 111) or greater, and between 0.005 inch (0.1 mm) and 0.060 inch (1.5 mm) thick, capable of bending into tight spaces or conforming to irregular surfaces, such as on or near seams on metal roofing where hail damage may be present, for example. The dashed-dotted lines represent such transparency in the drawings.

Figure 4:
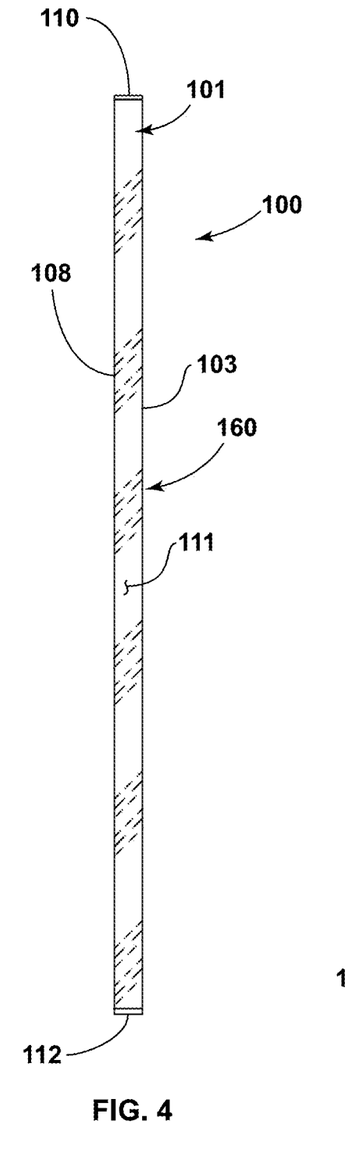
FIG. 4 is a right side elevation view of a building inspection and measurement device.
Figure 5:
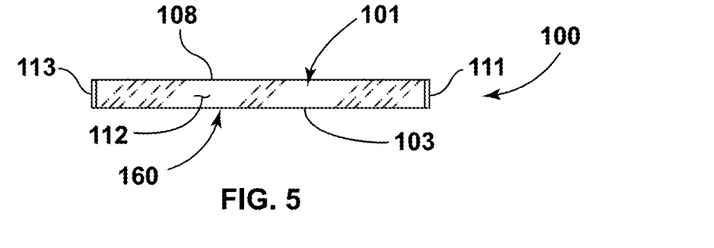
FIG. 5 is a bottom plan view of a building inspection and measurement device.

In another aspect, the body 101 is made from rigid, non-flexible acrylic or polycarbonate sheet or plate, measuring approximately 6 inches (15 cm) long by 2 inches (5 cm) wide or greater, and between 0.060 inches (1.5 mm) and 0.250 inches (6 mm) thick (as shown in FIGS. 4 and 5) or greater—capable of withstanding repeated drops from a ladder or roof without breaking. One suitable thermoplastic material is rigid extruded or injection-molded polycarbonate of thickness between 0.125 inches (3 mm) and 0.188 inches (4.5 mm), such as Monogal GP available from Plazit Polygal. This material offers suitable impact resistance, stability, and an operating temperature range exceeding a functional operating range between at least −40° F. (−40° C.) and +212° F. (100° C.). Material-substrate variations comprehended in the scope of this disclosure include, but are not limited to, transparent or colored opaque co-extruded thermoplastic with UV and anti-glare layers for improved field durability and high-contrast photographic images necessary for inspection documentation. Moreover, although one embodiment is shown as a rectangular shape with a 3:1 aspect ratio, other rectangular aspect ratios and perimeter shapes are comprehended, such as longer or shorter rectangular dimensions, or triangular or other polygonal perimeters optimized for overall surface area and edge availability for different measurement requirements.

The building inspection device 100 is not limited to implementations having a smooth border (i.e. defined by straight side edges 111-113) and may include cutouts, holes and other patterns suitable for a given measurement function. For example, one or more edges 111-113 may include a multiplicity of sized semicircular cutouts or scallops to measure nail or fastener wire gauges. Alternatively, full circular holes may be drilled, routed, or molded into the interior portion of the body 103 for testing of fastener compliance. Similar holes, including optional tapped holes, may be employed to estimate screw diameters and thread pitch in Imperial or metric units, or both. Such holes or edge scallops may also be used to estimate wire gauge of electrical wires, such as, but not limited to, common wire sizes including 10, 12 and 14 AWG or their metric equivalents, for example. With appropriate layout and placement of each measurement function it is possible to provide a single inspection and measurement device of compact size that supports four or more concurrent measurement functions, as discussed herein.

As shown in FIG. 4, edge 111 may be square so as to be perpendicular to both the bottom surface 103 and the opposite top surface 108 or may be angled inward from the bottom surface 103 to the top surface 108 such that the substrate 101 is tapered along the bottom view shown in FIG. 5 in a direction from the bottom surface 103 to the opposite top surface 108. The substrate 101 is shaded with dashed-dotted lines to show the transparency of the material of substrate 101. As further shown in FIG. 5, the edges 111 and 113 may also be square. Alternatively edges 111 and 113 may be angled inward with respect to the bottom surface 103 such that substrate 101 is tapered inward from the bottom surface 103 upward.

In yet another aspect, the device 100 may be constructed to allow the user to finely modify—by light sanding or trimming of the substrate 103 along one of the edges, such as top edge 110—the relative starting point of the measurement, such as ruler 120, from the edge 110 of the device for precise measurement of lippage. In the present context, the "lippage" is defined as the relative difference in level between adjacent floor tiles or other surfaces such as cracked slabs and walkways, which could cause accidental trip hazards.

Another substrate 103 variation contemplates replacing the thermoplastic with metal, such as titanium, anodized aluminum, steel or stainless steel, for example. While heavier and more expensive to produce, metal substrates offer the benefit of lower thermal coefficient of linear expansion by a factor of five to 10 when compared to common thermoplastic resins such as acrylic or polycarbonate. The present disclosure comprehends a wide range of available material substrates and is not limited to the examples listed above. For example, Schott AG ZERODUR® Class 2 has near-zero thermal expansion coefficient of 0.1 ppm/° C. or less, and is described as an "inorganic, non-porous Lithium Aluminum Silicon oxide glass ceramic characterized by evenly-distributed nano-crystals within a residual glass phase." Other glass products, such as tempered glass, laminated safety glass, and ultra-low expansion glass (e.g. glass available under the designation "ULE", from Corning, incorporated) also offer suitable thermal characteristics where dimensional stability is desired over a very wide temperature range.

The front elevation view of FIG. 2 depicts an example device 100 with four measurement gauges (which may also be referred to as individual reference features) on one face 103 of the body 101, such face 103 defining an area bounded by the respective edges 110, 111, 112, 113 of the device 100, such gauges being useable for assessing respective measurable parameters using device 100, namely, the above-described graduated ruler 120 to measure distance (length), a crack and material-width gauge 130 to measure width and thickness of cracks and building material cross sections, a slope gauge 140 to measure relative angular offset compared to a reference plane, and a hail gauge 150 to measure the diameter of indentations caused from hail impact of malleable surfaces, such as metal roofs and panels. As discussed, the included gauges overlap in various ways to fit the gauges within the bounded area of face 103. In particular, the ruler 120 and width gauge 130 are separated in direction 104 such that they overlap in direction 106 and the slope gauge 140 partially overlaps with both the ruler 120 and width gauge 130 in direction 106. As further shown, the hail gauge 150 overlaps with width gauge 130 in direction 106 and with slope gauge 140 in direction 104, as well as with the ruler 120 in both directions 104 and 106.

In the illustrated example, substrate 101 is a generally transparent material, such that the included gauges and other features, discussed below, can be printed on lower surface 103. In this arrangement, the relevant one of the gauges can be positioned adjacent the feature to-be measured by placing surface 103 in contact with the feature such that the gauge is generally flush with the feature, which improves accuracy by reducing parallax. As further shown, the gauges are positioned within a generally opaque portion of the device 100 such that the visual characteristics and markings on the measured feature do not interfere with the visualization of the gauge markings. To provide improved opacity, a solid color (e.g., white) ink layer 160 partially underlays a CMYK print layer composed of measurement gauges 120, 130, 140 and 150. An optional transparent gutter 165 separates the perimeter boundary of the white layer 160 from the left and right edges 113 and 111, respectively with portions of the ruler 120 and width gauge 130 extending into the gutter for feature visualization in comparison with the gauges. In this aspect, the opaque layer 160 may be terminated short of the left 113 and/or right 111 edges by, for example, about 0.125 inch (3 mm) to 0.25 inch (6 mm), and, in one embodiment, at 0.188 inch (4.5 mm) of the measurement device to define the gutters 165. This arrangement takes advantage of the transparency of the thermoplastic with significant measurement lines, such as ruler tick marks 121-128 and crack-width marks 131 may span the both the transparent gutter 165 as well as a portion of the opaque layer 160, which may improve the legibility of the marks, as well as the optical comparison to the underlying surface, such as a concrete wall with a crack, for example. The opaque layer 160 may also reveal only one transparent edge/gutter 165, with the opposing edge 111 or 113 being fully opaque. Nothing herein limits the terminal boundary or position of the white layer, which may be modified to suit the measurement needs and choice of substrate material.

In the illustrated example, ruler 120 is composed of a fine zero reference line 121 concentrically shrouded by a thicker but equal length reference line 122 that spans from the left edge 113 to the right edge 111 boundaries. In one example, the zero reference line 121 can be black with the thicker reference line 122 being red. It is noted that all colors herein are exemplary and, in certain aspects, may provide for desirable identification and visual distinction among such features. In various implementations, the contrasting areas depicted in the drawings in various shades of gray may be colored using a variety of mutually-contrasting colors. Major tick marks 123 (e.g., in red) and 124 (e.g., in black) repeat at graduated intervals, such as 1 inch or 1 centimeter. Intermediate minor tick marks 125 occur midway between major tick marks and reduce in size proportionally smaller in length and width as the distance between intermediate tick marks decreases. Finer intermediate tick marks 126-128 occur midway between adjacent minor tick marks in decreasing succession. The center of ruler 120 may be positioned to coincide with the vertical center of the inspection and measurement device, with a small gap at the top and bottom edges 110 and 112, respectively, to allow for manufacturing tolerances that may be present in the printing process. Measurement enumerations and other related text 129 are shown by way of example only and may be modified or omitted within the scope of the device 100, as presently disclosed. Tick marks 123-128 and enumerations 129 may be scaled and/or re-positioned to reflect differences between Imperial and metric scales, for example.

In another aspect, ruler 120 is disposed along the right edge 111 of the body 101, which may be at least 6 inches (150 mm) long, with major tick marks 124 in red ink with a center black line 123, so as to differentiate major tick marks from smaller tick marks 125-128. The length of the minor tick marks 125-128 reduces as they become smaller, as does the tick-mark 125-128 width. The combination of these two changes in tick-mark 125-128 length and width dimensions may provide fast and accurate measurement ability in the use of device 100.

Crack Gauge 130 may be composed of a multitude of equal-length parallel lines 131 of monotonically increasing line widths 131 intersecting the left edge 113 at the perimeter boundary and overlapping both the transparent gutter 165 and white layer 160. In some aspects, the white layer 160 may optionally extend fully to the left edge 113, right edge 111 or both edges. Again, the illustrated enumerations 139 and related text are exemplary only and may be modified, adjusted, or omitted within the scope of the device 100, as disclosed. Crack widths and enumerations may be scaled and/or re-positioned to reflect differences between Imperial and metric scales, for example, from as small as 0.001 inch (0.025 mm) to at least 0.250 inch (6.35 mm) or more, in increments as small as 0.001 inch or greater.

Slope Gauge 140 may be composed of a thick (e.g., red) zero reference line 145 and (e.g., black) graduated angular lines 141 at plus/minus 5-degree angular offsets from the zero reference line 141 (which may be red, for example) and intersecting at an apex 142 positioned partially along the zero reference line 141. Although a total of six angular lines 145 are shown, various particular embodiments may include fewer or more angular lines 145, limited, for example, by the dimensions and legibility of such configurations. The slope gauge 140 may be surrounded by a transparent area 165 extending within the opaque layer 160 to facilitate alignment of the reference line 141 with the sloped line against the structure/feature to be measured. Again, enumerations 149 and related text are exemplary only and may be modified, adjusted, or omitted within the scope of the disclosure. The slope gauge 140 can measure at least +/−15 degrees of slope relative to reference line 141, in angular increments of 5-degrees, or less. Larger measurement ranges and smaller increments are possible, such as to measure roof pitch, and are comprehended in this disclosure and are limited only by the overall gauge dimensions. Nothing is intended to restrict the potential range and resolution of angular measurements, which, theoretically, could cover a complete 360-degree range in 1-degree increments, for example.

Hail Gauge 150 may be composed of multiple, concentric, semicircular graduated diameters 151-156 of contrasting or otherwise clearly delineated appearance (e.g., alternating between blue and white, respectively) and, in one example, extending to overlap the ruler 120 and its tick marks 123-128 along the right edge 111 of body 103. Enumerations 159 and related text are exemplary only and may be modified, adjusted, or omitted within the scope of the disclosure. Hail gauge 150 may be positioned at the center of the right 111 or left edge 113 of the graduated linear ruler 120, depending on the orientation of the ruler 120, for example. The hail gauge 150, as shown in the example of FIG. 2, includes rings alternating in appearance (e.g., in color) to denote hail-impact diameters between 0.5 inch (13 mm) or less and 3 inches (76 mm) or greater. By overlapping the hail gauge 150 onto ruler 120, finer measurements of hail-impact diameter are possible by counting minor tick marks 125-128 on the ruler 120 that fall between the colored rings 151-156. In another example, the position of the hail gauge 150 may be shifted from the center of the ruler 120 edge (e.g., right edge 111) to instead start at the beginning of the ruler at the 0″ mark (i.e., adjacent top edge 110. In other examples, the hail gauge 150 may be at other useful or desired positions along either edge 111 or 113.

Notably, the measurement device 100 may include a plurality of the above-described measurement features or gauges, which may be described as including or otherwise comprising reference features particularly suited for assessing a respective "measurable parameter" (e.g., length, as measured or assessed using the ruler 120 tick marks 121-128, or hail impact diameter, as measured by the rings 151-156 of hail gauge 150, etc.). In one implementation, all of the above-described reference features may be included on the device 100, allowing the device 100 to be used to assess all of the respectively-associated parameters, with the reference features being overlapped, stacked, nested, or otherwise arranged in both the lateral 104 and longitudinal 106 directions of the substrate 103 with respect to each other to include the reference features within the above-described dimensions of the device 100. Notably, such an arrangement allows for the device 100 to be smaller than the measurement dimensions provided by the sum of the individual reference features in one or both of the latitudinal 104 or longitudinal 106 directions.

Figure 3:
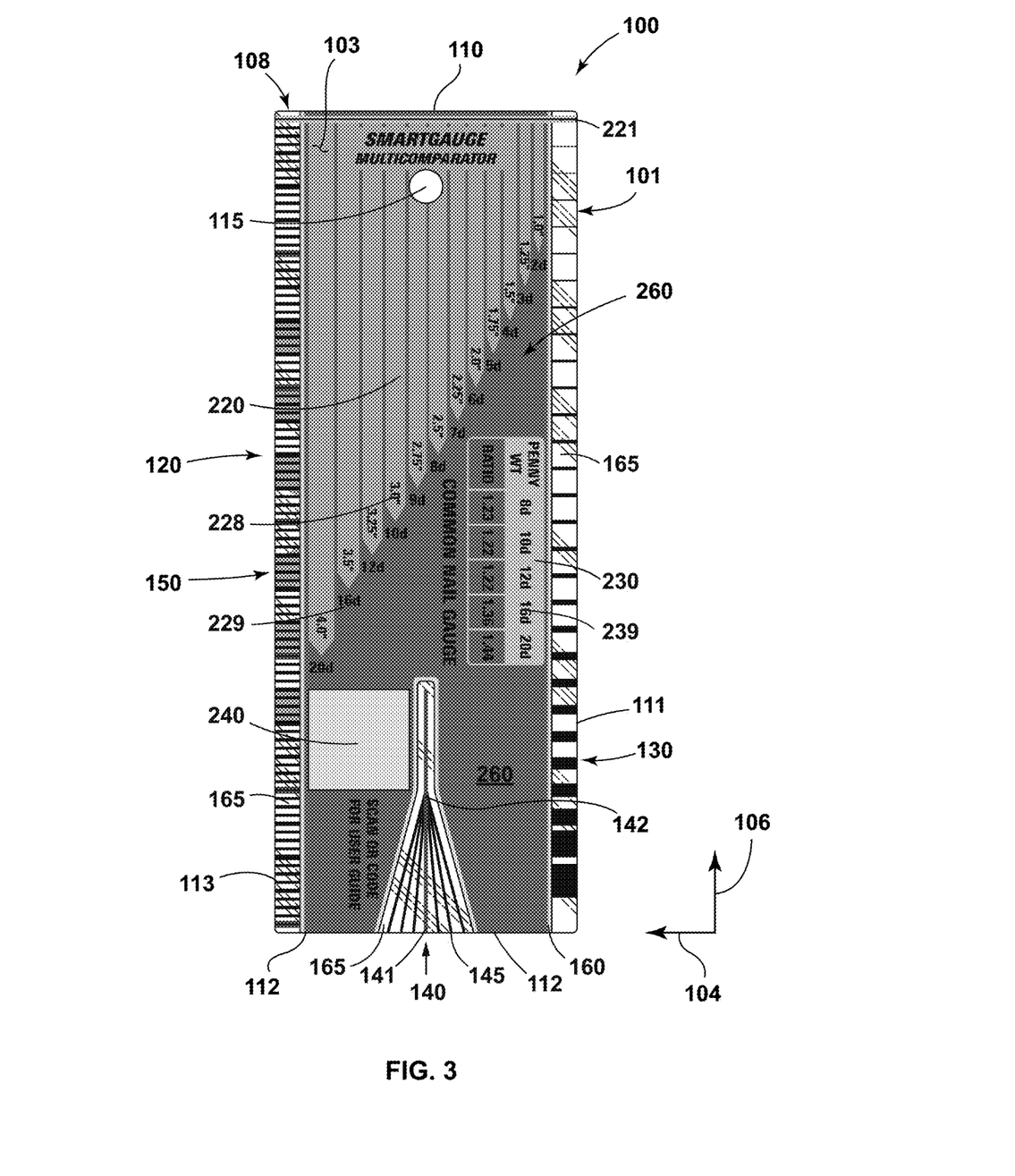
FIG. 3 is a rear elevation view of a building inspection and measurement device.

FIG. 3 shows the rear (back) side of the device 100 illustrating another aspect, wherein the device 100 utilizes both sides of the opaque layer 160. In such an arrangement, the device 100 is configured to be used with the top side 108 oriented upward or away from the measured feature to measure distances, slopes, crack width and material thickness, hail-impact diameter, as discussed above, by visualizing the side of the opaque layer 160 facing surface 108 through the transparent body 101. On the reverse side of opaque layer 160, additional reference features may be included (e.g., by printing on opaque layer 160) for measurement of common-nail length and width via visual comparison. The components and reference features of the outside surface of opaque layer 160 (i.e., away from surface 108) not already referenced in FIG. 1 or 2 may include a nail gauge 220, a nail head reference line 221 (printed, for example, in black), a nail conversion chart 230, and an additional layer 260 (in another solid color layer, such as dark gray) superimposed over the opaque layer 160. The nail gauge 220 may comprise at least 12 graduated nail sizes (e.g. 2 d to 20 d) and widths corresponding to common nail sizes. The nail length 228 in inches or millimeters may be impositioned near the tip of each nail, and the nominal nail size may appear just below each diamond tip. Table 230 may also be included and may provide a cross-reference between box nails and common nail sizes by multiplying the number of common nails by a ratio and rounding up to the nearest whole number to obtain the equivalent number of box nails. This can be used to help achieve comparable structural integrity if common nails are not available. Enumerations 228, 229 and 239, and related text are exemplary only, including by showing exemplary placement of such features, and may be modified, adjusted, or omitted within the scope of the disclosure. Area 240 may be allocated for a QR code which, when used in conjunction with a mobile device or QR code reader, may direct the user to an instruction manual and/or user guide. The broken line of area 240 is used to indicate a possible area for positioning of the QR code and may be modified or omitted within the scope of the present disclosure. In one aspect, a user can scan a QR code within the area 240 to access online documentation, user instructions and examples, as well as code-specific requirements and updates. In another aspect, there is space on the front or back side for a company logo, which may be customized for various markets and constituents. In another aspect, a unique serial ID or other variable data may be printed for engineering traceability, which may be useful in litigation and legal proceedings relating to structural damage or insurance claims.

In another aspect, to achieve the above-described arrangement of the various gauges with respect to the opaque layer 160 and the surfaces 103, 108 of body 103, the device 100 can be fabricated including a back-printed multi-layer UV printing process in at least three separate ink layers, consisting of a first four-color layer of cyan, magenta, yellow and black (CMYK) that includes ruler 120, width gauge 130, slope gauge 140 and hail gauge 150, including the various associated markings, a second layer consisting of the above-described opaque layer 160 printed over the first layer with one or more applications of opaque white, for example. The printing process can then be followed by third layer 260 of black ink grayscale or color (CMYK) including the nail gauge 220, conversion chart 230, and QR-code area 240. The combination and selection of colors for each such layer may optimize overall opacity, prevent bleed-through from one side to the other, as well as improve legibility of scales and ease-of-use by incorporating color. Moreover, by back-printing all layers (e.g. on surface 103) in a single pass, color registration may be improved between layers, cost may be reduced (compared to multiple printing passes), and parallax may be eliminated when viewing from the transparent front-side 108 of the device 100. To improve opacity even further, one or more additional opaque (e.g. white) layers may be back printed and superimposed after the first opaque layer 160. While UV printing is one possible printing method, this disclosure comprehends other printing and marking methods optimized for the material and manufacturing process. These may include but are not limited to pad printing, offset printing, screen printing and laser marking, for example.

In yet another aspect, one or a plurality of replaceable bubble-level vials and/or fine-slope indicators may be removably affixed to the inspection and measuring device in a vertical, horizontal, and/or angular position relative to the device edges 110, 111, 112, or 113.

It is to be understood that variations and modifications can be made on the aforementioned structure, its use, and fabrication without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An inspection and measurement device, comprising:
a body defining a first planar face within a first bounded area;
a first reference feature disposed on the first planar face within the first bounded area and corresponding with a first measurable parameter for structural inspection; and
a second reference feature disposed on the first planar face within the first bounded area and corresponding with a second measurable parameter for structural inspection;
wherein:
the first and second reference features are positioned within the first bounded area for placement adjacent an element bearing the respective one of the first and second measurable parameters;
the first and second reference features overlap within the first bounded area in at least one direction; and
the first and second reference features are respective ones of a crack- or material-thickness gauge, a hail circumference gauge, and a slope gauge.

2. The device of claim 1, wherein:
the at least one direction is a first direction; and
the first bounded area has a first dimension in the first direction corresponding with a dimension of one of the first and second reference features in the first direction, the other of the first and second reference features overlapping with the one of the first and second reference features along the first direction.

3. The device of claim 1, wherein the first and second reference features at least partially overlap in at least two perpendicular directions.

4. The device of claim 1, wherein:
the first and second reference features occupy respective areas of the first bounded area, each of the respective areas having a length in a second direction perpendicular to the first direction; and
the first bounded area has a length in the second direction of at least a sum of the lengths in the second direction of the areas of the first and second reference features.

5. The device of claim 4, further including a third reference feature disposed on the first planar face within the first bounded area, corresponding with a third measurable parameter for structural inspection, and having a length in the second direction, wherein:
the length of the first bounded area in the second direction is less than a sum of the respective lengths in the second direction of the first, second, and third reference features.

6. The device of claim 4, wherein:
the body is transparent and further defines a second surface opposite a first surface; and
at least the first reference feature faces the second surface.

7. The device of claim 6, wherein the second reference feature faces the second surface.

8. The device of claim 1, wherein:
the crack- or material-thickness gauge is defined by a plurality of marks of increasing width extending over a linear area for measuring crack and material width;
the slope gauge is defined by a plurality of lines extending from an apex at a predetermined length and distributed over a predetermined angular range for measuring relative slope between two features; and
the hail circumference gauge is defined by a plurality of concentric semi-circular elements radiating from a center and extending outward over an area for measuring hail-impact diameter.

9. The device of claim 1, further including a third reference feature disposed on the first planar face within the first bounded area and corresponding with a third measurable parameter for structural inspection.

10. The device of claim 9, wherein the third reference feature includes a nail gauge array accompanied by a conversion chart between Common Nails and Box Nails.

11. The device of claim 9, wherein:
the body is transparent and further defines a second surface opposite a first surface;
the first and second reference features are disposed on the first surface and face the second surface; and
the third reference feature is disposed on the first surface and faces away from the second surface.

12. The device of claim 11, wherein:
the first and third reference features are printed on opposite sides of a printing layer applied on the first surface;
the printing layer is spaced apart from at least one edge of the first surface; and
at least one of the first and third reference features extends past the printing layer and to the at least one edge.

13. An inspection and measurement device, comprising:
a transparent body defining a first planar face within a first bounded area and a second planar face spaced apart from the first planar face;
a first reference feature disposed on the first planar face within the first bounded area and corresponding with a first measurable parameter;
a second reference feature disposed on the first planar face within the first bounded area and corresponding with a second measurable parameter; and
an opaque layer disposed on the first planar face and spaced from at least one edge of the transparent body, the opaque layer being disposed over a portion of the first reference feature and at least a portion of the second reference feature;

wherein:

the first and second reference features are positioned within the first bounded area for placement adjacent an element bearing the respective one of the first and second measurable parameters, at least the first reference feature extending past the opaque layer to the edge of the transparent body; and the first and second reference features overlap within the first bounded area in at least one direction.

14. The inspection and measurement device of claim 13, wherein the first and second reference features are positioned within the first bounded area for placement adjacent an element bearing the respective one of the first and second measurable parameters.

15. The inspection and measurement device of claim 13, wherein the first and second reference features are respective ones of:

a ruler defined by a plurality of tick marks extending over and equally distributed among a predetermined linear area for measuring length;

a crack- or material-thickness gauge defined by a plurality of marks of increasing width extending over a linear area for measuring crack and material width;

a slope gauge defined by a plurality of lines extending from an apex at a predetermined length and distributed over a predetermined angular range for measuring relative slope between two features; and a hail circumference gauge defined by a plurality of concentric semi-circular elements radiating from a center and extending outward over an area for measuring hail-impact diameter.

16. The inspection and measurement device of claim 13, wherein the first and second reference features are visible through the transparent body from the second planar face.

17. The inspection and measurement device of claim 16, further including a third reference feature disposed on the first planar face within the first bounded area over the opaque layer, facing away from a second surface, and corresponding with a third measurable parameter.

18. The inspection and measurement device of claim 17, wherein the third reference feature includes a nail gauge array accompanied by a conversion chart between Common Nails and Box Nails.

19. An inspection and measurement device, comprising:

a transparent body defining a first planar face within a first bounded area and a second planar face spaced apart from the first planar face;

a first reference feature disposed on the first planar face within the first bounded area, facing the second planar face, and corresponding with a first measurable parameter for structural inspection;

a second reference feature disposed on the first planar face, facing the second planar face, and corresponding with a second measurable parameter for structural inspection; and a third reference feature disposed on the first planar face, facing away from the second planar face, and corresponding with a third measurable parameter for structural inspection;

wherein:

the first and second reference features are positioned within the first bounded area for placement adjacent an element bearing the respective one of the first and second measurable parameters; and the first and second reference features overlap within the first bounded area in at least one direction.

* * * * *